US005551061A

United States Patent [19]

Schwendeman

[11] Patent Number: 5,551,061

[45] Date of Patent: Aug. 27, 1996

[54] APPARATUS AND METHOD IN A RADIO COMMUNICATION SYSTEM FOR DISTINGUISHING AN IDENTIFIER OF A NEARBY TRANSMITTER FROM THAT OF A MORE DISTANT TRANSMITTER

[75] Inventor: Robert J. Schwendeman, Pompano Beach, Fla.

[73] Assignee: Motorola, Inc., Schaumburg, Ill.

[21] Appl. No.: 201,509

[22] Filed: Feb. 24, 1994

[51] Int. Cl.$^6$ .................................................. H04Q 7/32

[52] U.S. Cl. .......................... 455/51.1; 455/561; 342/457

[58] Field of Search ................................. 455/33.2, 33.4, 455/51.1, 54.1, 56.1; 342/450, 386, 457, 464

[56] References Cited

U.S. PATENT DOCUMENTS

| | | | |
|---|---|---|---|
| 4,232,317 | 11/1980 | Freeny, Jr. | 342/464 |
| 4,891,638 | 1/1990 | Davis . | |
| 5,159,593 | 10/1992 | D'Amico . | |
| 5,208,756 | 5/1993 | Song | 342/457 |
| 5,212,822 | 5/1993 | Fukumin et al. | 455/56.1 X |
| 5,230,081 | 7/1993 | Yamada | 455/56.1 X |
| 5,293,642 | 3/1994 | Lo | 455/56.1 X |
| 5,293,645 | 3/1994 | Soop | 455/54.1 X |
| 5,305,466 | 4/1994 | Taketsuga | 455/56.1 X |
| 5,394,158 | 2/1995 | Chia | 342/457 |

*Primary Examiner*—Edward F. Urban
*Attorney, Agent, or Firm*—R. Louis Breedon

[57] ABSTRACT

An apparatus and a method in a radio communication system repeatedly transmit and receive identifiers including a nearby identifier received by a radio receiver from a nearby transmitter, and distant identifiers received from more distant transmitters. The method and the apparatus distinguish in a probabilistic manner the nearby identifier from the distant identifiers by determining the identifier received most dependably over a predetermined period.

8 Claims, 9 Drawing Sheets

2/9
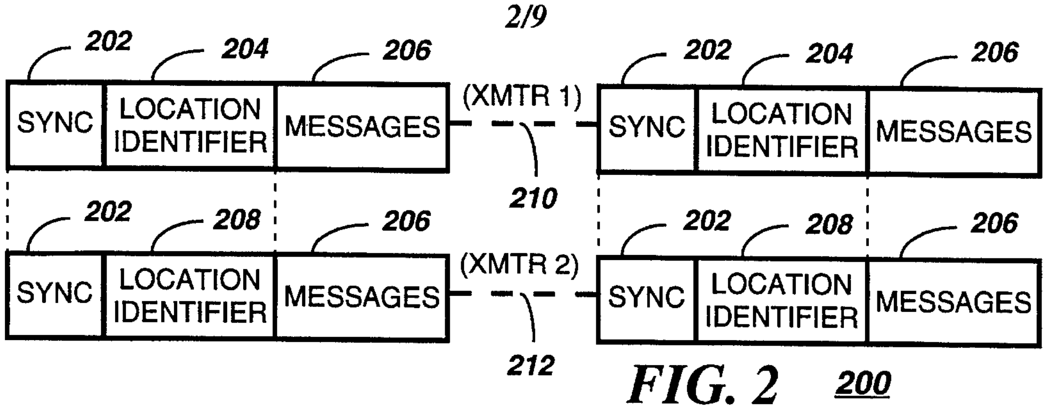
FIG. 2 200
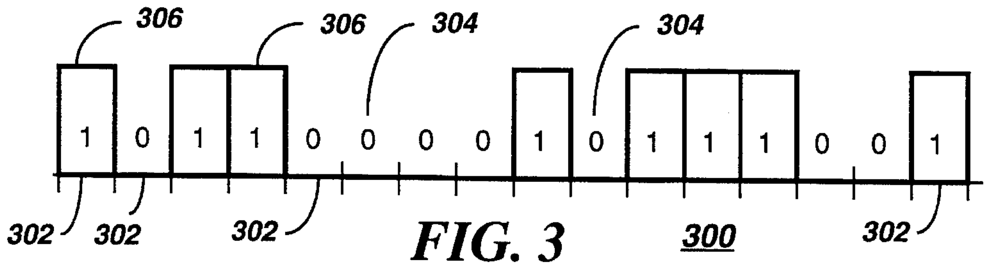
FIG. 3 300
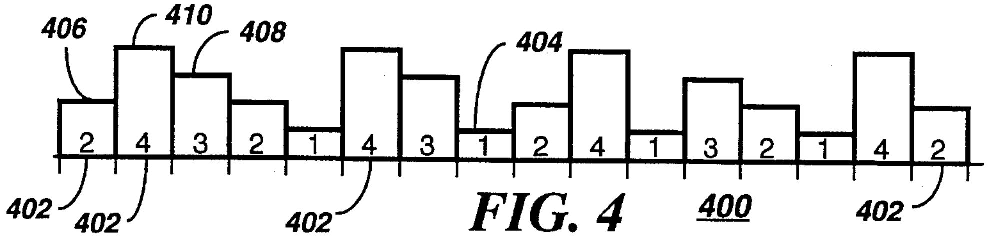
FIG. 4 400
110, 112
FIG. 5
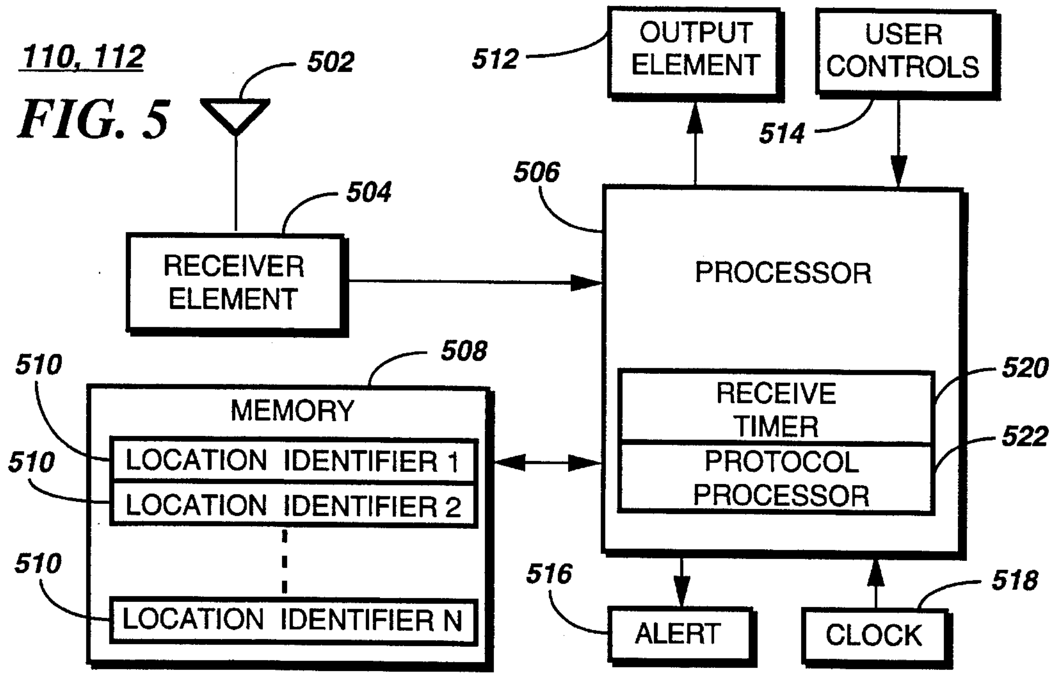

700

800

1200

1300

APPARATUS AND METHOD IN A RADIO COMMUNICATION SYSTEM FOR DISTINGUISHING AN IDENTIFIER OF A NEARBY TRANSMITTER FROM THAT OF A MORE DISTANT TRANSMITTER

FIELD OF THE INVENTION

This invention relates in general to radio communication systems, and more specifically to an apparatus and a method associated therewith in a radio communication system for distinguishing an identifier received from a nearby transmitter from identifiers received from other more distant transmitters.

BACKGROUND OF THE INVENTION

Radio communication systems capable of transmitting and displaying channel identification information to confirm proper operation of a portable radio receiver on a system at an expected location are well known. One such system is described in U.S. Pat. No. 4,981,638 to Davis, entitled "Nationwide Display Pager with Location Readout."

In a system that covers a wide area through a plurality of transmitters, location information received by the portable radio receiver preferably is that location information transmitted by the one of the plurality of transmitters that is nearest the portable radio receiver. Unfortunately, time-variant shadowing and multipath effects present in the radio communication system can cause the nearest transmitter at times not to be dominant over more distant transmitters as the portable radio receiver moves about the system. As a result, the location information received by the portable radio receiver can sometimes be incorrect.

Such momentarily incorrect location information can cause improper operation of the portable radio receiver if the receiver is near a boundary between locations that are intended to control the portable radio receiver to function differently from one location to the next. For example, if the user is near a time zone boundary, and the location information is used to automatically reset a clock in the receiver to display the time of day according to the time zone in which the receiver is located, the clock can occasionally display the wrong time of day.

Thus, what is needed is a method and an apparatus for distinguishing location information that is transmitted from a nearby transmitter from that transmitted by more distant transmitters in the system, even in the presence of the aforementioned time-variant shadowing and multipath effects.

SUMMARY OF THE INVENTION

An aspect of the present invention is a portable radio receiver for receiving information comprising location identifiers each having a location value. The location identifiers include a nearby location identifier transmitted by a nearby transmitter and distant location identifiers transmitted by more distant transmitters in a radio communication system comprising the portable radio receiver and a plurality of the transmitters. The portable radio receiver distinguishes the nearby location identifier from the distant location identifiers. The location identifiers are transmitted repeatedly in periodic transmissions. The portable radio receiver comprises a receiver for receiving over a predetermined period a plurality of the periodic transmissions comprising the location identifiers. The location identifiers are received multiple times throughout the predetermined period. The portable radio receiver further comprises a memory coupled to the receiver for storing the location identifiers received in the plurality of the periodic transmissions, and a processor coupled to the memory for comparing stored portions of the location identifiers with one another to determine the location value received with greatest dependability relative to all other location values received during the predetermined period. The processor defines the location value received with the greatest dependability to be the location value of the nearby location identifier. The periodic transmissions from ones of the plurality of the transmitters are synchronized with the periodic transmissions from others thereof, and the periodic transmissions are frequency modulated (FM) simulcast transmissions. The portable radio receiver has a defined capture ratio, and the receiver comprises a demodulator for demodulating a location identifier corresponding to a strongest transmitter producing a highest signal strength at the portable radio receiver during each of the periodic transmissions. The highest signal strength is greater by at least the defined capture ratio than a signal strength produced at the portable radio receiver by the plurality of the transmitters other than the strongest transmitter. The processor comprises a sorter coupled to the memory for sorting into like-valued groups the location values that are equal to one another, and a counter coupled to the sorter for counting the location values sorted into each of the like-valued groups to determine one of the like-valued groups having a highest count. The processor further comprises a concluder coupled to the counter for concluding therefrom that the location value of the one of the like-valued groups having the highest count is the location value received with the greatest dependability.

Another aspect of the present invention is a probabilistic method in a radio communication system comprising a plurality of transmitters and a portable radio receiver. The method is for transmitting and receiving information comprising location identifiers each having a location value. The location identifiers include a nearby location identifier transmitted to the portable radio receiver by a nearby transmitter, and distant location identifiers transmitted to the portable radio receiver by more distant transmitters. The method is further for distinguishing the nearby location identifier from the distant location identifiers. The location identifiers are transmitted repeatedly in periodic transmissions. The method comprises in the portable communication receiver the steps of receiving over a predetermined period a plurality of the periodic transmissions comprising the location identifiers, wherein the location identifiers are received multiple times throughout the predetermined period; and storing the location identifiers received in the plurality of the periodic transmissions. The method further comprises the steps of comparing stored portions of the location identifiers with one another to determine the location value received with greatest dependability relative to all other location values received during the predetermined period, and defining the location value received with the greatest dependability to be the location value of the nearby location identifier. The periodic transmissions from ones of the plurality of the transmitters are synchronized with the periodic transmissions from others thereof, and the periodic transmissions are frequency modulated (FM) simulcast transmissions The portable radio receiver has a defined capture ratio, and the receiving step comprises the step of demodulating a location identifier corresponding to a strongest transmitter producing a highest signal strength at the portable radio receiver during each of the periodic transmissions. The highest signal strength is greater by at least the defined capture ratio than a signal strength produced at the portable radio receiver by the plurality of the transmitters other than the strongest transmitter. The comparing step comprises the steps of sorting into like-valued groups the location values that are equal to one another, and counting the location values sorted into each of the like-valued groups to determine one of the like-valued groups having a highest count. The comparing step further comprises the step of concluding from the counting step that the location value of the one of the like-valued groups having the highest count is the location value received with the greatest dependability.

BRIEF DESCRIPTION OF THE DRAWINGS

FIG. 2 is a signal timing diagram utilized in the radio communication system in accordance with the preferred and first alternative embodiments of the present invention.

FIG. 3 depicts a typical bit pattern for a location identifier transmitted by the radio communication system in accordance with the preferred and first and second alternative embodiments of the present invention.

FIG. 4 depicts a typical symbol pattern for the location identifier transmitted by the radio communication system in accordance with the preferred and first and second alternative embodiments of the present invention.

FIG. 5 is an electrical block diagram of a portable radio receiver in accordance with the preferred and first and second alternative embodiments of the present invention.

DESCRIPTION OF THE PREFERRED AND ALTERNATIVE EMBODIMENTS

Figure 1:
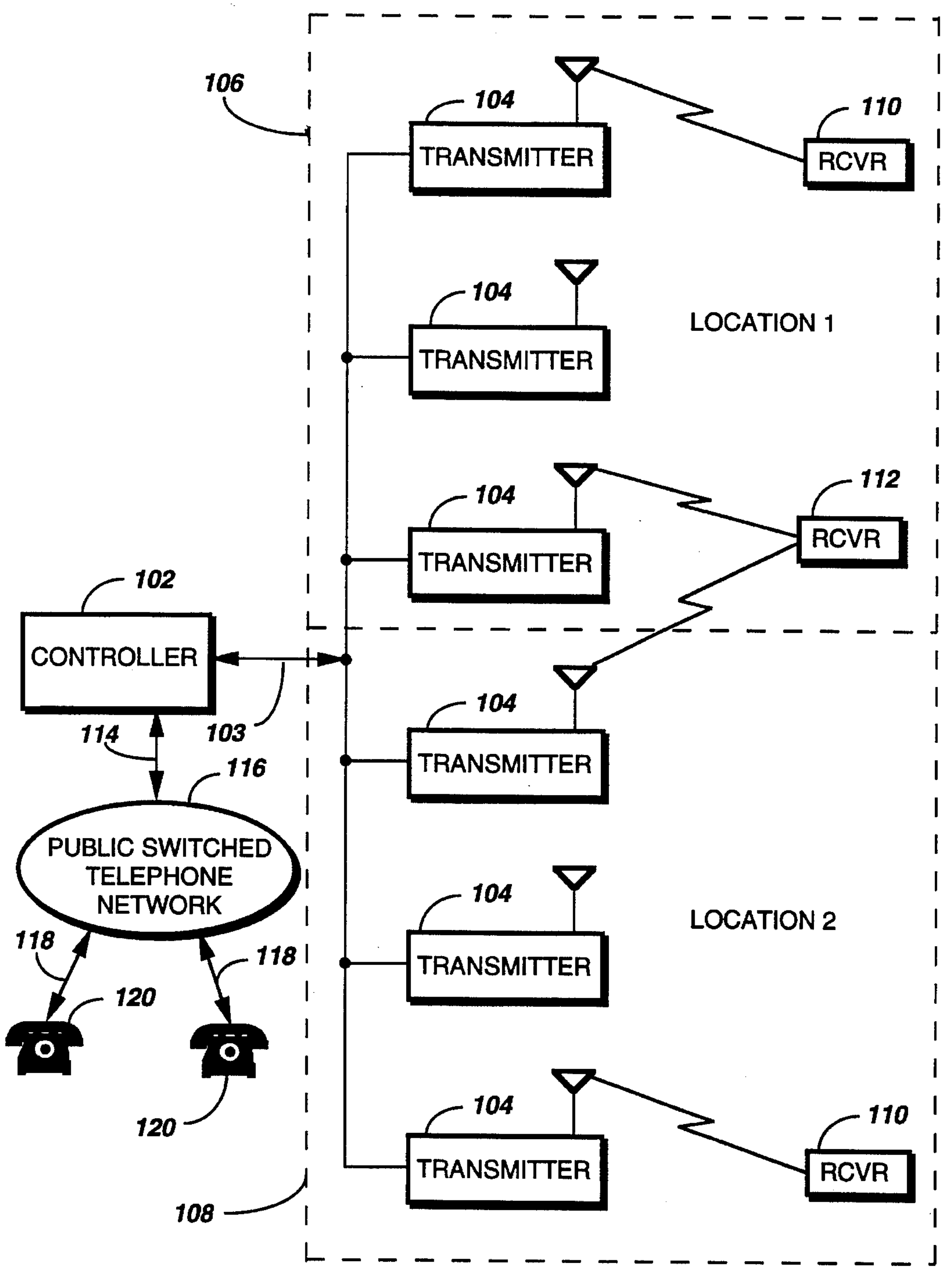
FIG. 1 is an electrical block diagram of a radio communication system in accordance with the preferred and first and second alternative embodiments of the present invention.

Referring to FIG. 1, an electrical block diagram of a radio communication system in accordance with the preferred and first and second alternative embodiments of the present invention comprises a controller 102 coupled by communication links 103 to transmitters 104 for control thereof. The transmitters are positioned throughout a first location 106 and a second location 108 for providing radio coverage thereto. Each of the transmitters 104 preferably transmits a location identifier 204, 208 (FIG. 2) having a location value associated with the first or second location 106, 108 in which the transmitter is positioned. A receiver that is positioned well inside one of the locations 106, 108, e.g., the portable radio receiver 110, is likely to receive a single location identifier 204, 208 corresponding to the first or second location 106, 108 in which the portable radio receiver 110 is positioned. A receiver that is positioned near a boundary between the first and second locations 106, 108, e.g., the portable radio receiver 112, may receive over time location values corresponding to both the first and second locations 106, 108, depending upon shadowing and multipath effects at any given instant in time.

While the portable radio receiver 112 can receive at an instant in time either a nearby transmitter 104 in the first location 106 or a more distant transmitter 104 in the second location 108, the location identifier 204, 208 from the nearby transmitter 104 has a higher probability of dependable reception over time. Thus, in accordance with the preferred and alternative embodiments of the present invention, the portable radio receiver 110, 112 preferably does not react precipitously to a single location identifier 204, 208 received during one instant in time. Instead, the portable radio receiver 110, 112 preferably monitors and stores a plurality of location identifiers 204, 208 received over a predetermined period, e.g., sufficient time to receive ten transmissions of the location identifiers 204, 208. Then, using probabilistic methods to determine the location value that was received the most dependably over the predetermined period, as described herein below, the portable radio receiver 110, 112 defines the location value to be that transmitted by the nearby transmitter.

The radio communication system of FIG. 1 preferably is coupled to the public switched telephone network (PSTN) 116 by telephone trunks 114 for communicating with callers using telephones 120 coupled to the PSTN 116 by telephone lines 118. In one form of the radio communication system, the callers can place calls to the controller 102 to cause radio pages to be sent to users of the receiver 110, 112 in a manner well known in the art.

Preferably, the controller 102 is similar to a model MPS 2000® paging control center, the transmitters 104 are similar to a model C73 PURC 5000® transmitter, and the portable radio receiver 110, 112 is similar to a model A03KLB5962CA ADVISOR® pager, all manufactured by Motorola., Inc. of Schaumburg, Ill. It will be appreciated that other similar equipment may be used as well to construct the radio communication system of FIG. 1.

Three embodiments of the present invention are described herein below. Briefly, in accordance with the preferred embodiment, the location identifiers 204, 208 are transmitted as simulcast transmissions from the transmitters 104, and the bits/symbols of the location identifiers 204, 208 received over the predetermined period are stored in the portable radio receiver 110, 112. The bits/symbols associated with each bit/symbol position of the location identifier 204, 208 are then compared with one another. If more than a predetermined percentage, e.g., seventy percent, of the bits/symbols of the bit/symbol position are the same value, then the value becomes the estimated value for the bit/symbol position. The resultant location identifier 204, 208 comprising the estimated bit/symbol values of all bit/symbol positions is then assumed to be the most dependably received location value, and thus to be the location value transmitted by the transmitter 104 nearest the portable radio receiver 110, 112. The preferred embodiment is particularly advantageous for a receiver that is moving rapidly in a multipath environment, because the preferred embodiment allows the received data to be examined and compared over a maximally brief interval, i.e., the interval of a single bit or symbol.

In accordance with the first alternative embodiment of the present invention, the location identifiers 204, 208 are transmitted as simulcast frequency modulated (FM) transmissions. The portable radio receiver 110, 112 is an FM receiver having a defined capture ratio, i.e., able to accurately receive a first signal in the presence of a second (differing) signal if the first signal is stronger than the second signal by at least the capture ratio of the receiver, e.g., three decibels. The transmissions of the location identifiers 204, 208 are monitored over the predetermined period, and the capture effect of the portable radio receiver 110, 112 is relied upon to cause the portable radio receiver 110, 112 to receive the location identifier 204, 208 of the nearest transmitter 104 more often than that of other transmitters during the predetermined period. At the end of the predetermined period, the location values are grouped into like valued groups, and the largest group is assumed to contain the location value transmitted by the nearest transmitter. The first alternative embodiment requires less processing power to implement than the preferred embodiment, but it is not able to respond as quickly as the preferred embodiment in a rapidly changing multipath environment, because the first alternative embodiment compares signals received over many bit/symbol positions instead of just one.

In accordance with the second alternative embodiment of the present invention, the location identifiers 204, 208 are transmitted sequentially, one location identifier 204, 208 per time slot, so that each can be received without interference during the predetermined period. The portable radio receiver 110, 112 measures the received signal strength of each transmission, and stores the location identifiers 204, 208 and corresponding signal strengths. At the end of the predetermined period, the portable radio receiver 110, 112 determines the mean signal strength over the predetermined period of each time slot. The location identifier 204, 208 corresponding to the time slot having the highest mean signal strength is then assumed to contain the location value transmitted by the nearest transmitter. The second alternative embodiment is most suitable for a system in which simulcast transmission of the location identifier 204, 208 is impossible or undesirable.

Referring to FIG. 2, a signal timing diagram 200 utilized in the radio communication system of FIG. 1 in accordance with the preferred and first alternative embodiments of the present invention depicts a simulcast signaling protocol. The signal timing diagram 200 includes transmissions 210 from a first transmitter and transmissions 212 from a second transmitter. In a simulcast system the transmitters 104 are synchronized with one another such that one of the transmitters 104 transmits a synchronization word 202, a location identifier 204, and messages 206 at substantially the same time that any other of the transmitters 104 transmits the synchronization word 202, a possibly different location identifier 208, and the messages 206, as indicated by a comparison of the transmissions 210, 212. Preferably, the location identifiers 204, 208 are transmitted periodically so that the receivers 110, 112 will receive multiple transmissions of the location identifiers 204, 208 over the predetermined period.

Referring to FIG. 3, a typical pattern of digital data bits 300 for the location identifiers 204, 208 transmitted by the radio communication system of FIG. 1 in accordance with the preferred and first and second alternative embodiments of the present invention includes a plurality of predetermined bit positions 302 containing bits 304 representing a value of zero, and bits 306 representing a value of one. The digital data bits 300 represent the location value transmitted for the location identifiers 204, 208.

Referring to FIG. 4, a typical pattern of digital data symbols 400 for the location identifiers 204, 208 transmitted by the radio communication system of FIG. 1 in accordance with the preferred and first and second alternative embodiments of the present invention includes a plurality of predetermined symbol positions 402 containing symbols 404, 406, 408, 410 representing, for example, values of one, two, three, and four, respectively. It will be appreciated that either bits or symbols may be selected for transmitting the location value of the location identifiers 204, 208, in accordance with the preferred and first and second alternative embodiments of the present invention, the selection being a matter of design choice.

Referring to FIG. 5, an electrical block diagram of the portable radio receiver 110, 112 in accordance with the preferred and first and second alternative embodiments of the present invention comprises an antenna 502 for intercepting the radio transmissions comprising the location identifiers 204, 208 transmitted by the transmitters 104. The antenna 502 is coupled to a conventional receiver element 504 for demodulating the radio transmissions. The receiver element 504 is coupled to a processor 506 for decoding and processing information carried in the radio transmissions, the information including the location identifiers 204, 208. The processor 506 is coupled to a memory 508, e.g., a conventional random access memory (RAM), for storing the location identifiers 204, 208 in memory locations 510 therefor. The processor 506 is also coupled to an output element 512, such as a conventional liquid crystal display, for displaying the received information.

The processor 506 is further coupled to user controls 514, such as well-known switches and buttons, for allowing a user to control the portable radio receiver 110, 112. In addition, the processor 506 is coupled to an alert element 516, e.g., a conventional piezoelectric transducer or lamp for generating an audible or visible alert in response to receiving information intended for the portable radio receiver 110, 112. A conventional clock 518 is also coupled to the processor 506 for providing a time signal to the processor 506.

The processor 506 comprises firmware elements including a receive timer 520 for measuring the predetermined period over which the portable radio receiver 110, 112 monitors the transmissions of the location identifiers 204, 208. The firmware elements preferably also include a protocol processor 522 for processing the location identifiers 204, 208 in accordance with a protocol comprising an error-detecting code, an error-correcting code, or an error-correcting-and-error-detecting code to more accurately determine the most dependably received location value for the location identifiers 204, 208, as is explained herein below.

Preferably, the processor 506 is similar to the MC68HC05, C08, or C11 series microcomputers manufactured by Motorola, Inc. of Schaumburg, IL. It will be appreciated that other similar devices can be utilized for the processor 506 as well. It will be further appreciated that the memory 508 and the clock 518 can be incorporated as integral portions of the processor 506 as well.

Figure 6:
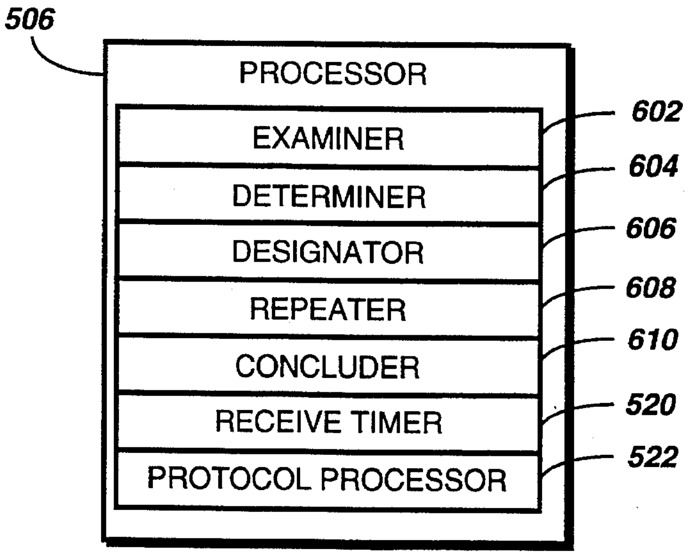
FIG. 6 is a firmware diagram depicting firmware elements utilized by a processor in the portable radio receiver in accordance with the preferred embodiment of the present invention.

Referring to FIG. 6, a firmware diagram 600 depicting firmware elements utilized by the processor 506 in the portable radio receiver 110, 112 in accordance with the preferred embodiment of the present invention comprises an examiner 602 for examining at one of the plurality of predetermined bit/symbol positions 302/402 the digital data bits/symbols 300/400 corresponding to the location identifiers 204, 208 received and stored during the predetermined period measured by the receive timer 520. The firmware diagram further comprises a determiner 604 coupled to the examiner 602 for determining that more than a predetermined percentage of the digital data bits/symbols 300/400 at the one of the plurality of predetermined bit/symbol positions 302/402 have a single coequal value.

The firmware diagram also includes a designator 606 coupled to the determiner 604 for designating the single coequal value to be an estimated bit/symbol value for the one of the plurality of predetermined bit/symbol positions 302/402. In addition, the firmware diagram includes a repeater 608 for repeating the examining, determining, and designating for each of the plurality of predetermined bit/symbol positions 302/402, until a plurality of estimated bit/symbol values corresponding to the plurality of predetermined bit/symbol positions 302/402 have been designated. The firmware diagram further comprises a concluder 610 for concluding that the plurality of estimated bit/symbol values represent the most dependable location value received during the predetermined period. It will be appreciated that some or all the firmware elements depicted in the firmware diagram 600 can be fabricated in hardware as well, as a custom designed integrated circuit, for example.

Figure 7:
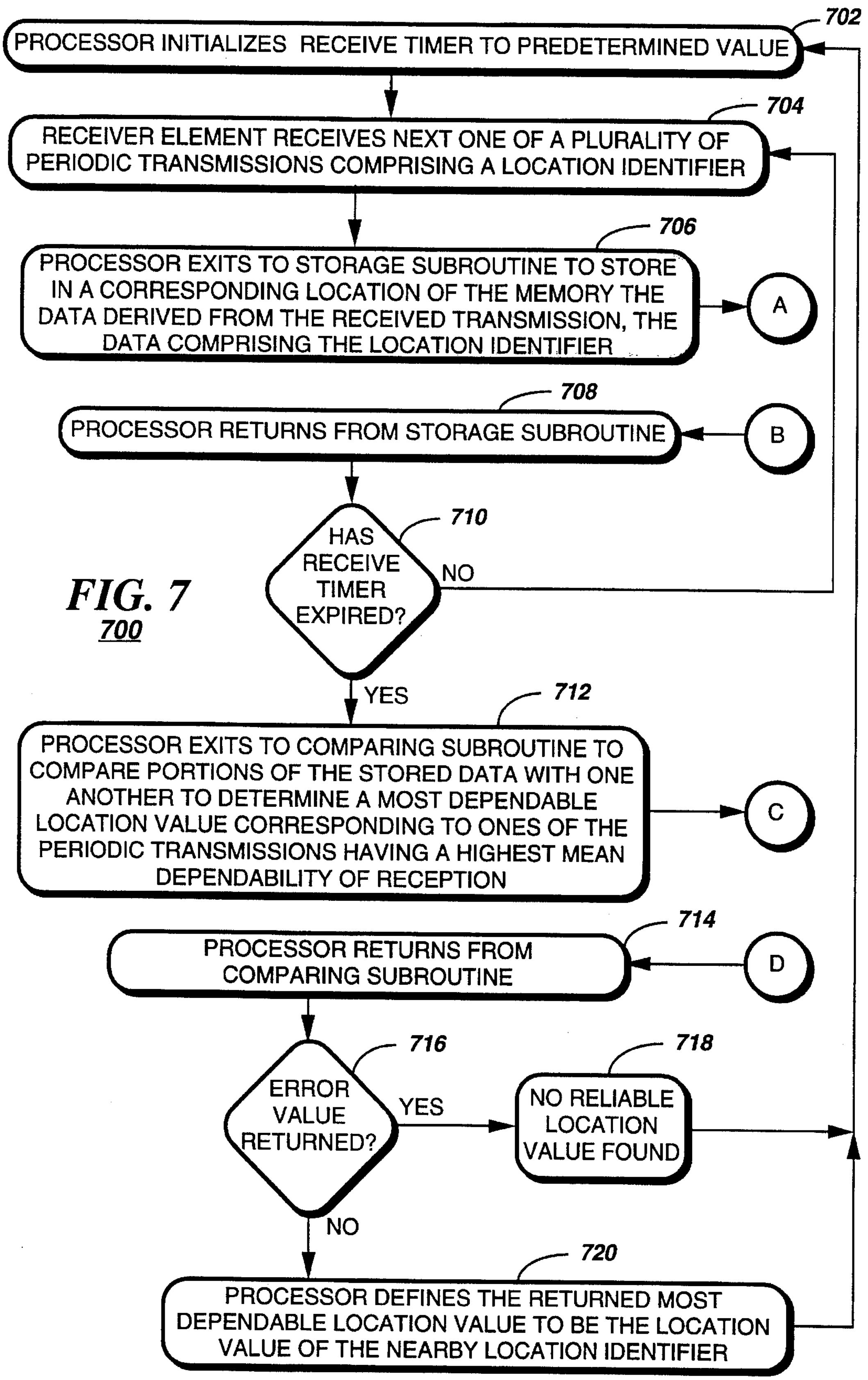
FIG. 7 is a flowchart of the operation of the portable radio receiver in accordance with the preferred and first and second alternative embodiments of the present invention.

Referring to FIG. 7, a flowchart 700 of the operation of the portable radio receiver 110, 112 in accordance with the preferred and first and second alternative embodiments of the present invention begins with the processor 506 initializing 702 the receive timer 520 to a predetermined value. Then the receiver element 504 receives 704 a next one of the plurality of periodic transmissions including the location identifier 204, 208. The processor 506 next exits 706 to one of the storage subroutines 800, 1800 (FIGS. 8, 18) to store in a next available one of the memory locations 510 the data derived from the received transmission, the data including the location identifier 204, 208. More specifically, the storage subroutine 800 is utilized for the preferred and first alternative embodiments, and the alternative storage subroutine 1800 is utilized for the second alternative embodiment.

When the processor 506 returns 708 from the one of the storage subroutines 800, 1800, the processor 506 checks 710 whether the receive timer 520 has expired. If not, the processor 506 returns to step 704 to receive another of the periodic transmissions. If, on the other hand, the receive timer has expired, then the processor 506 exits 712 to one of the comparing subroutines 900, 1300, 1900 (FIGS. 9, 13, 19) to compare portions of the stored data with one another to determine a most dependable location value corresponding to ones of the periodic transmissions having a highest mean dependability of reception. More specifically, the comparing subroutines 900, 1300, and 1900 are utilized for processing the preferred embodiment, the first alternative embodiment, and the second alternative embodiment, respectively.

When the processor 506 returns 714 from the one of the comparing subroutines 900, 1300, 1900, the processor 506 checks 716 whether a predetermined error value was returned. If so, the processor recognizes 718 that no reliable location value could be determined, and then returns to step 702 to start over. If, on the other hand, a valid most dependable location value was returned, the processor 506 then defines 720 the most dependable location value to be the location value of the nearby location identifier 204, 208, i.e., the location identifier 204, 208 transmitted by a transmitter closest to the portable radio receiver 110, 112. Then the processor 506 returns to step 702 to begin the process anew.

Thus, the present invention advantageously can reliably distinguish the nearby location identifier 204, 208 from the more distant location identifiers 204, 208 of the radio communication system, thereby providing a much greater degree of certainty that operational decisions based upon the received location identifier 204, 208 will be made correctly.

Figure 8:
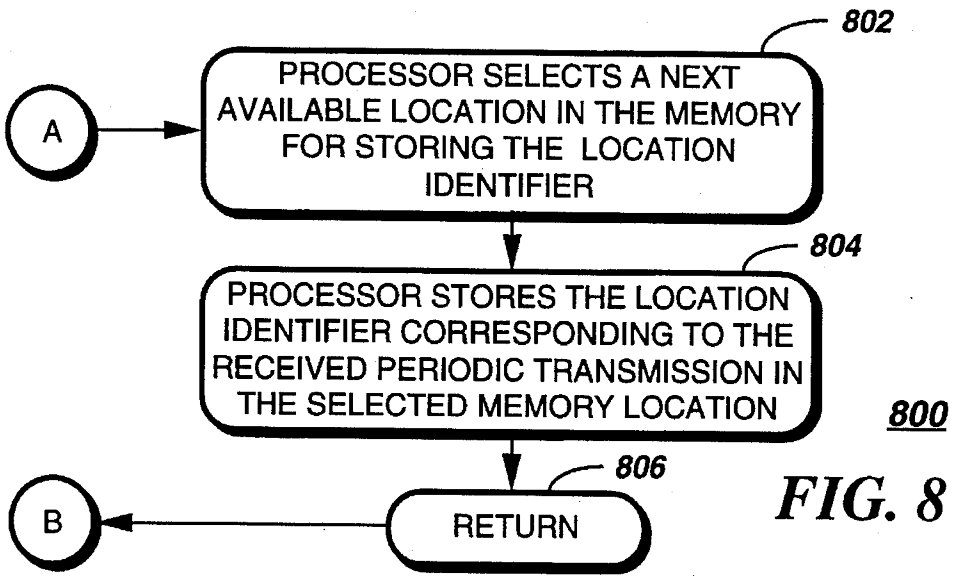
FIG. 8 is a flowchart of a storage subroutine in accordance with the preferred and first alternative embodiments of the present invention.

Referring to FIG. 8, a flowchart of the storage subroutine 800 in accordance with the preferred and first alternative embodiments of the present invention begins with the processor 506 selecting 802 a next available location 510 in the memory 508 for storing the location identifier 204, 208. Then the processor 506 stores 804 the location identifier 204, 208 in the selected memory location 510, and returns 806 to the flowchart 700 (FIG. 7).

Figure 9:
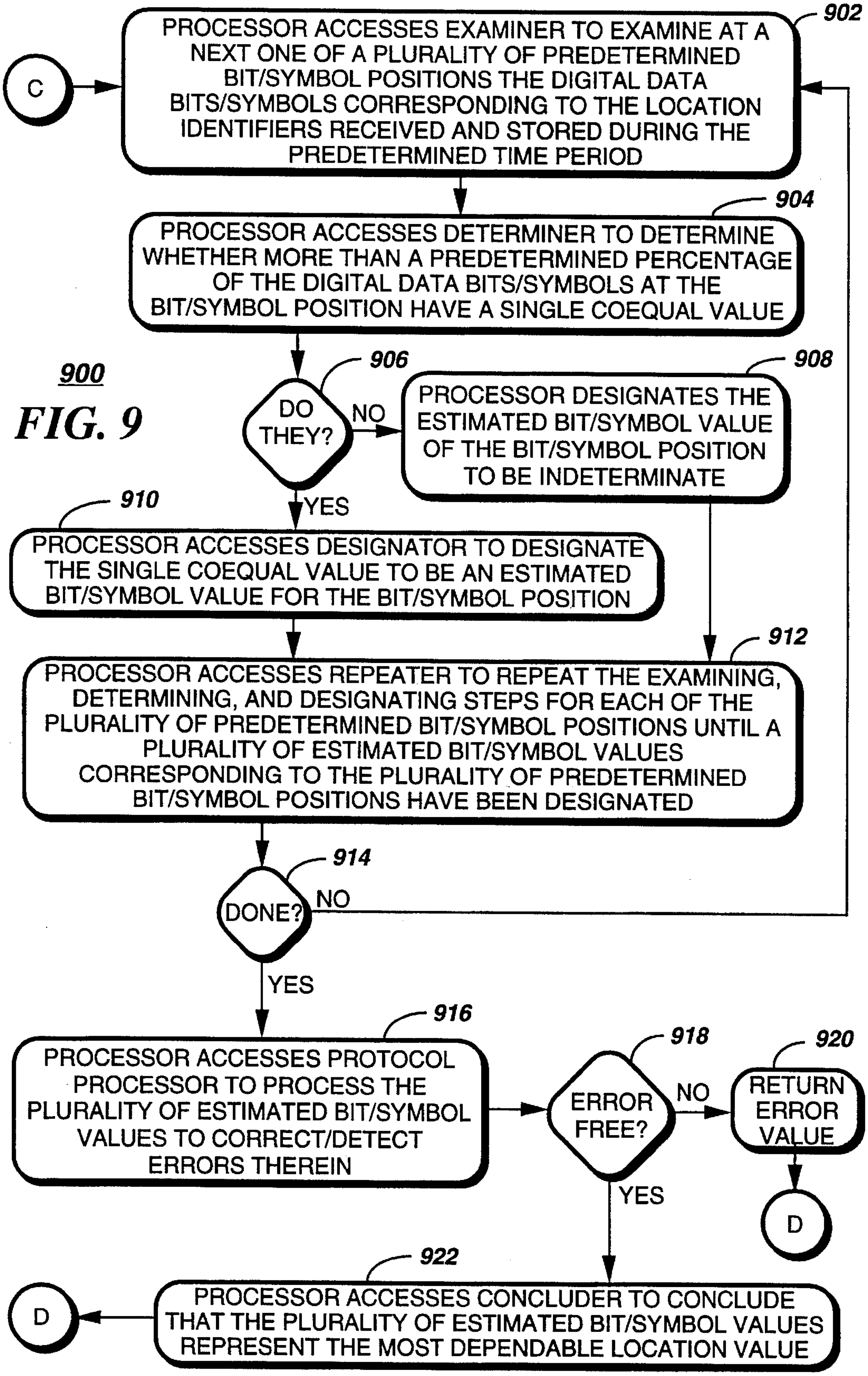
FIG. 9 is a flowchart of a comparing subroutine in accordance with the preferred embodiment of the present invention.

Referring to FIG. 9, a flowchart of the comparing subroutine 900 in accordance with the preferred embodiment of the present invention begins with the processor 506 accessing the examiner 602 to examine 902 at one of the plurality of bit/symbol positions 302, 402 the digital data bits/symbols corresponding to the location identifiers 204, 208 received and stored during the predetermined period. Then the processor 506 accesses the determiner 604 to determine 904, 906 whether more than a predetermined percentage of the digital data bits/symbols at the bit/symbol position have a single coequal value. If so, the processor 506 accesses the designator 606 to designate 910 the single coequal value to be an estimated bit/symbol value for the bit/symbol position. Then the processor 506 accesses 912 the repeater 608 to repeat 912, 914 the examining, determining, and designating steps for each of the plurality of bit/symbol positions, by returning to step 902 until an estimated bit/symbol value has been designated for all the plurality of bit/symbol positions.

If, on the other hand, in steps 904, 906 the processor 506 does not determine that more than a predetermined percentage of the digital data bits/symbols at the bit/symbol position have a single coequal value, then the processor designates 908 the estimated bit/symbol value for the bit/symbol position to be indeterminate. Then the flow continues to step 912, as before.

When in step 914 the processor 506 determines that values for all the bit/symbol positions have been estimated, the processor 506 accesses the protocol processor 522 to process 916 the plurality of estimated bit/symbol values to correct or detect errors therein in accordance with the type of protocol utilized. That is, if an error-detecting protocol is utilized, then the location value represented by the estimated bit/symbol values can be checked to determine if it is error free. If an error-correcting protocol is utilized, then up to a predetermined number of bit/symbol errors can be corrected as well. Error-detecting, error-correcting, and error-correcting- and-error-detecting protocols as utilized in the protocol processor 522 are conventional and well known to one of ordinary skill in the art.

If, after error detection/correction, the processor 506 determines 918 the plurality of estimated bit/symbol values to be error free, then the processor 506 accesses the concluder 610 to conclude 922 that the plurality of estimated bit/symbol values represent the most dependable location value, which value is then returned to the flowchart 700 (FIG. 7). If, on the other hand, the processor 506 determines in step 918 that the plurality of estimated bit/symbol values is not error free, then the processor 506 returns 920 the predetermined error value to the flowchart 700.

Figure 10:
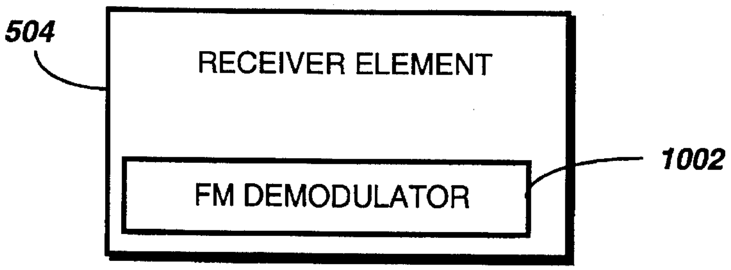
FIG. 10 is an electrical block diagram of a first alternative receiver element in accordance with the first alternative embodiment of the present invention.

Referring to FIG. 10, an electrical block diagram of a first alternative receiver element 1000 in accordance with the first alternative embodiment of the present invention comprises a conventional FM demodulator 1002. The FM demodulator 1002 is characterized by a defined capture ratio. As described herein above for an FM simulcast environment, the first alternative receiver element 1000 is able to accurately receive a first signal in the presence of a second (differing) signal if the first signal is stronger than the second signal by at least the defined capture ratio. This means that if a first location identifier 204, 208 transmitted by a nearby transmitter is received more strongly by at least the defined capture ratio than a second location identifier 204, 208 transmitted by a more distant transmitter, then the first location identifier 204, 208 is the one that will "capture" the portable radio receiver 110, 112. Due to shadowing and multipath, the nearby transmitter may not be received the most strongly one-hundred percent of the time. From a probabilistic point of view, however, over the predetermined period it is highly likely that the nearby transmitter will capture the portable radio receiver 110, 112 during a majority of the transmissions. It is this fact that provides an operational basis for the first alternative embodiment.

Figure 11:
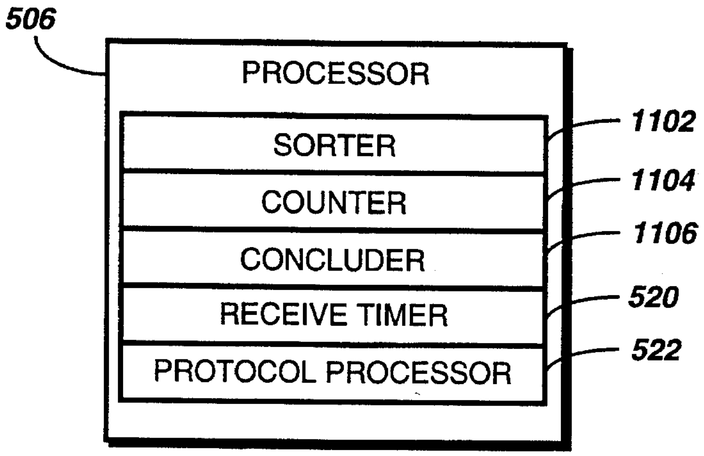
FIG. 11 is a first alternative firmware diagram depicting firmware elements utilized by the processor in the portable radio receiver in accordance with a first alternative embodiment of the present invention.

Referring to FIG. 11, a first alternative firmware diagram 1100 depicting firmware elements utilized by the processor 506 in the portable radio receiver 110, 112 in accordance with the first alternative embodiment of the present invention comprises a sorter 1102 for sorting into like-valued groups the location values that are equal to one another. The first alternative firmware diagram 1100 further comprises a counter 1104 for counting the location values sorted into each of the like-valued groups to determine one of the like-valued groups having a highest count. The first alternative firmware diagram 1100 further comprises a concluder 1106 for concluding therefrom that the location value of the one of the like-valued groups having the highest count is the most dependable location value. It will be appreciated that some or all the firmware elements depicted in the first alternative firmware diagram 1100 can be fabricated in hardware as well, as a custom designed integrated circuit, for example.

Figure 12:
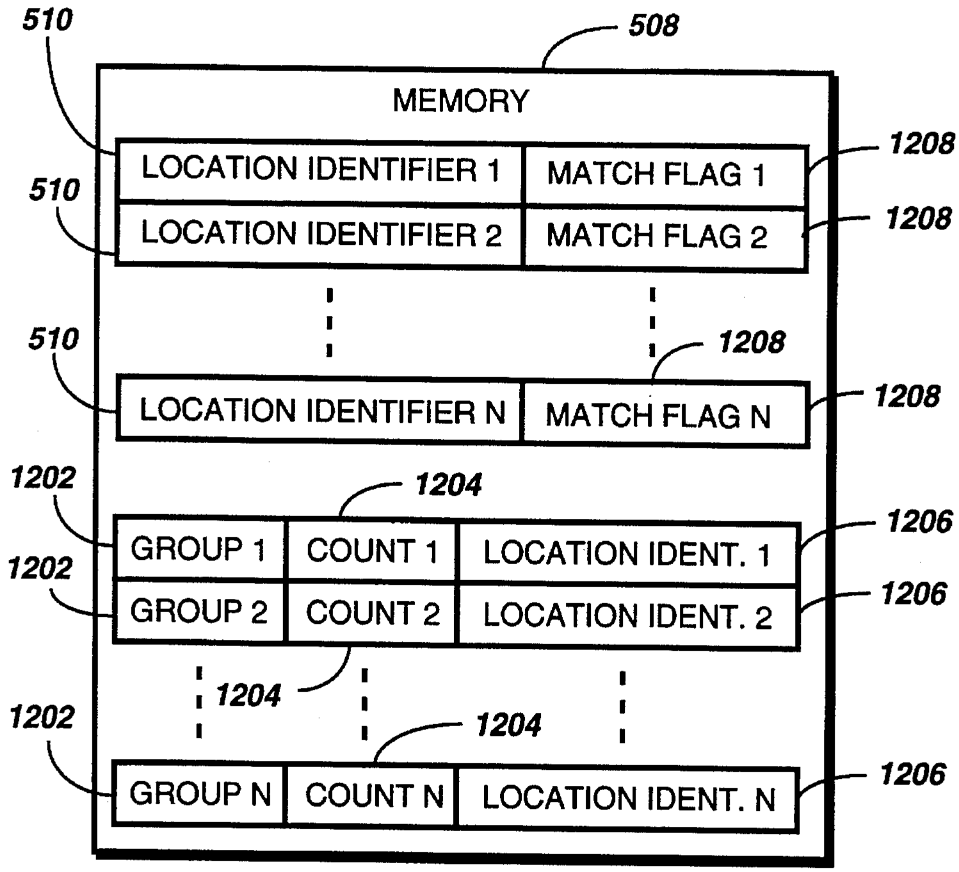
FIG. 12 is a first alternative memory utilization chart for the portable radio receiver in accordance with the first alternative embodiment of the present invention.

Referring to FIG. 12, a first alternative memory utilization chart 1200 for the portable radio receiver 110, 112 in accordance with the first alternative embodiment of the present invention depicts group identifiers 1202 for identifying the like-valued groups. The first alternative memory utilization chart 1200 further depicts count locations 1204 corresponding to the group identifiers 1202 for storing a count of the location values sorted into each of the like-valued groups, and corresponding location identifier slots 1206 for storing the location value corresponding to each of the like-valued groups In addition, the first alternative memory utilization chart 1200 depicts match flags 1208 corresponding to each of the memory locations 510 containing a location identifier 204, 208 for indicating that the location identifier 204, 208 has been compared with the other location identifiers 204, 208 stored in the memory 508.

Figure 13:
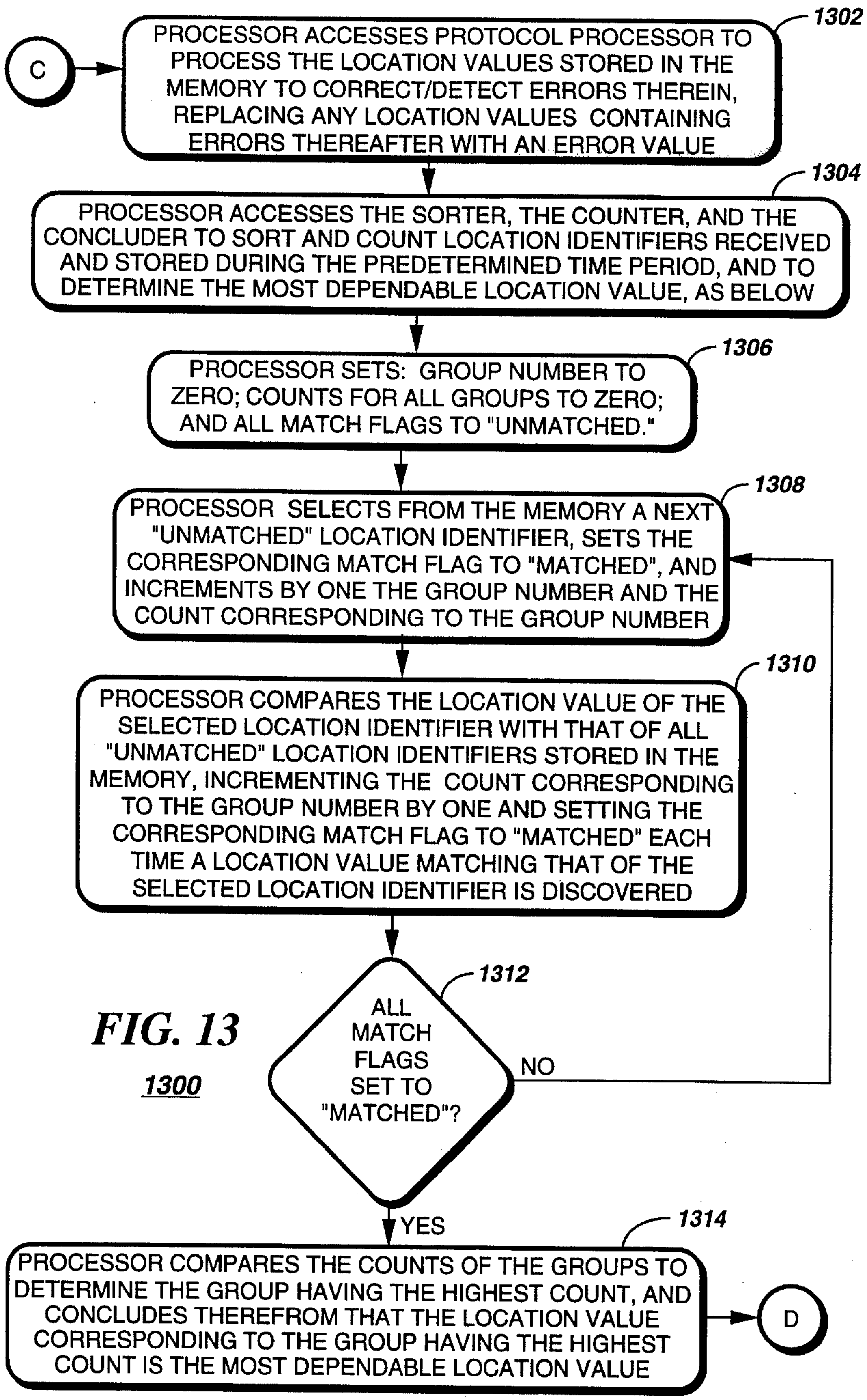
FIG. 13 is a flowchart of a first alternative comparing subroutine in accordance with the first alternative embodiment of the present invention.

Referring to FIG. 13, a flowchart of the first alternative comparing subroutine 1300 in accordance with the first alternative embodiment of the present invention begins with the processor 506 accessing the protocol processor 522 to process 1302 the location values of the location identifiers 204, 208 stored in the memory 508. The processing corrects/detects errors in the location values in accordance with the protocol utilized. A location value that contains an error after the processing is replaced with the predetermined error value.

Next, the processor 506 accesses 1304 the sorter 1102, the counter 1104, and the concluder 1106 to sort and count the location identifiers 204, 208 and to determine the most dependable location value. More specifically, the processor 506 initializes 1306 a group tracking number to zero, counts of all the count locations 1204 to zero, and all the match flags 1208 to "unmatched." Next, the processor 506 selects 1308 from the memory 508 an "unmatched" location identifier 204, 208 from one of the memory locations 510. The processor 506 sets the corresponding match flag 1208 to "matched," and increments by one the group tracking number and the count of the count location 1204 corresponding to the group identifier 1202 that matches the group tracking number. The processor also writes the location value of the selected location identifier 204, 208 into the corresponding location identifier slot 1206.

The processor 506 then compares 1310 the location value of the selected location identifier 204, 208 with that of all "unmatched" location identifiers 204, 208 stored in the memory 508. Whenever a location value matching that of the selected location identifier 204, 208 is encountered, the processor 506 increments the count in the count location 1204 corresponding to the group identifier 1202 and sets the match flag 1208 corresponding to the memory location 510 containing the matched location value to "matched."

The processor next checks 1312 to determine whether all the match flags 1208 corresponding to the memory locations 510 that contain a location value are set to "matched." If not, the processor 506 returns to step 1308 to select a next "unmatched" location identifier 204, 208 for matching. If, on the other hand, in step 1312 the processor 506 determines that the all match flags 1208 corresponding to the memory locations 510 that contain a location value are set to "matched," then the processor 506 compares 1314 the counts contained in the count locations 1204 to determine the group having the highest count. The processor 506 then concludes that the location value contained in the location identifier slot 1206 corresponding to the group having the highest count is the most dependable location value, which value is then returned to the flowchart 700 (FIG. 7).

Figure 14:
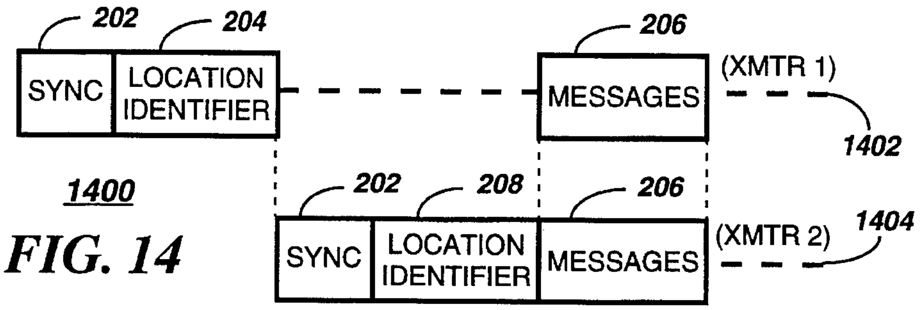
FIG. 14 is an alternative signal timing diagram utilized in the radio communication system in accordance with a second alternative embodiment of the present invention.

Referring to FIG. 14, an alternative signal timing diagram 1400 utilized in the radio communication system in accordance with the second alternative embodiment of the present invention is similar to the signal timing diagram 200, the essential difference being that the transmission of the synchronization word 202 and the location identifier 204, 208 is sequential. That is, each synchronization word 202 and each location identifier 204, 208 corresponding to a transmission 1402, 1404 preferably is transmitted in a dedicated transmission time slot that does not overlap with any other transmission time slot utilized by the system in the same general receiving area. It will be appreciated that the messages 206 may be simulcast, as depicted in FIG. 14, or sent sequentially, as well.

Figure 15:
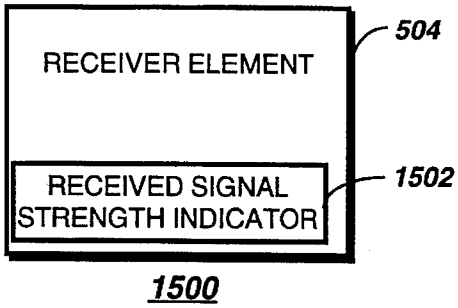
FIG. 15 is an electrical block diagram of a second alternative receiver element in accordance with the second alternative embodiment of the present invention.

Referring to FIG. 15, an electrical block diagram of a second alternative receiver element 1500 in accordance with the second alternative embodiment of the present invention comprises a conventional received signal strength indicator (RSSI) 1502 for measuring and reporting to the processor 506 the signal strength of received transmissions.

Figure 16:
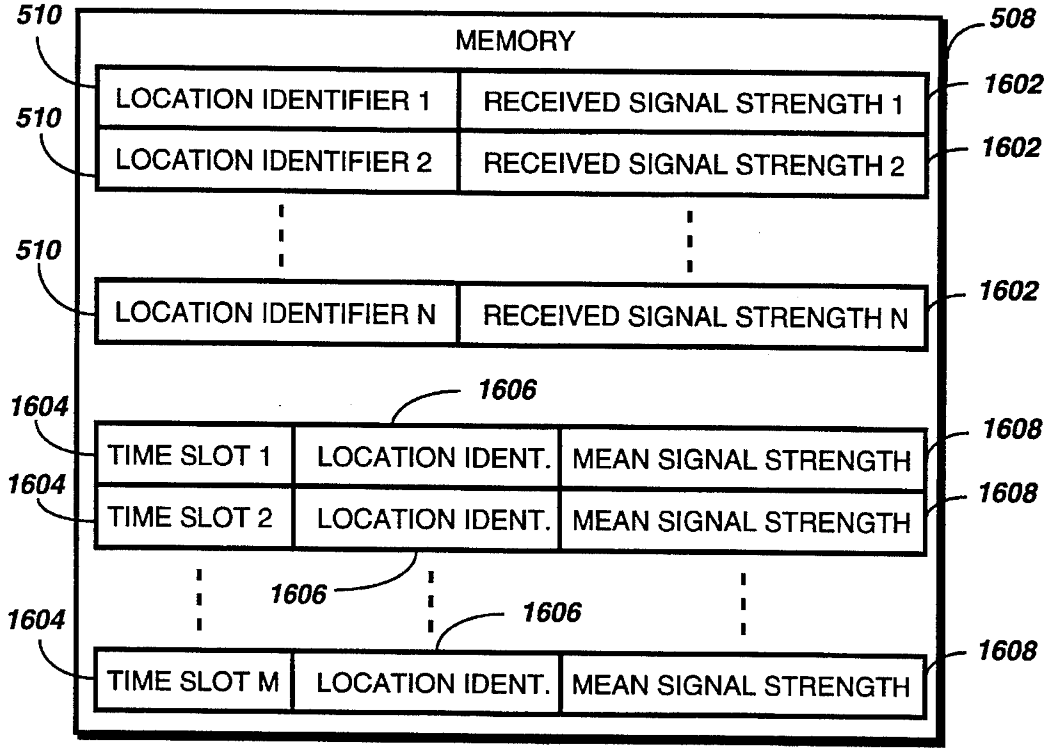
FIG. 16 is a second alternative memory utilization chart for the portable radio receiver in accordance with the second alternative embodiment of the present invention.

Referring to FIG. 16, a second alternative memory utilization chart 1600 for the portable radio receiver 110, 112 in accordance with the second alternative embodiment of the present invention depicts RSSI locations 1602 for storing a received signal strength corresponding to location values stored in the memory locations 510. For each of the transmission time slots, there is a time slot identifier 1604, a location identifier space 1606 corresponding to the time slot, and a corresponding mean signal strength space 1608.

Figure 17:
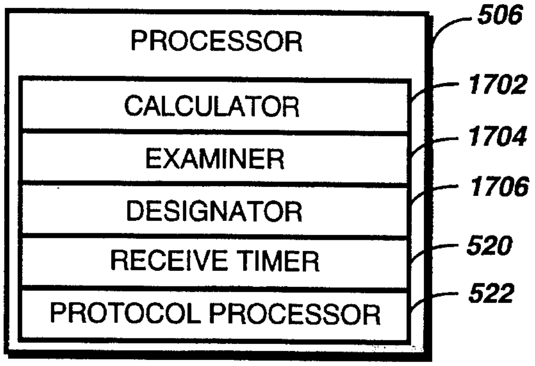
FIG. 17 is a second alternative firmware diagram depicting firmware elements utilized by the processor in the portable radio receiver in accordance with the second alternative embodiment of the present invention.

Referring to FIG. 17, a second alternative firmware diagram 1700 depicting firmware elements utilized by the processor in the portable radio receiver 110, 112 in accordance with the second alternative embodiment of the present invention comprises a calculator 1702 for calculating from the received signal strengths stored in the RSSI locations 1602, for each of the transmission time slots, a mean received signal strength value of the periodic transmissions occurring therein over the predetermined period. The second alternative firmware diagram 1700 further comprises an examiner 1704 for examining the mean received signal strength values calculated to determine the transmission time slot having a highest mean received signal strength value. The second alternative firmware diagram 1700 also includes a designator 1706 coupled to the examiner for designating the location value received during said transmission time slot to be the most dependable location value. It will be appreciated that some or all the firmware elements depicted in the second alternative firmware diagram 1700 can be fabricated in hardware as well, as a custom designed integrated circuit, for example.

Figure 18:
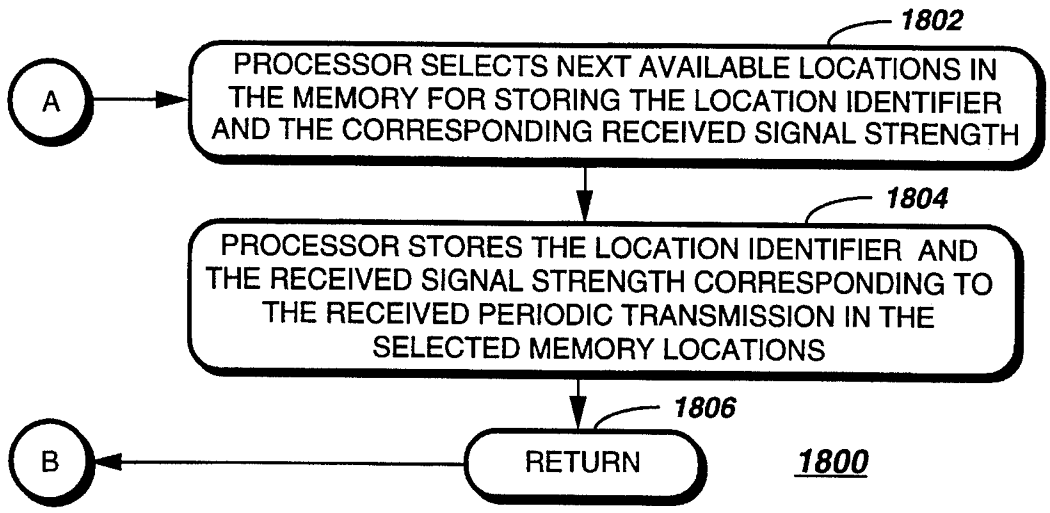
FIG. 18 is a flowchart of an alternative storage subroutine in accordance with the second alternative embodiment of the present invention.

Referring to FIG. 18, a flowchart of the alternative storage subroutine 1800 in accordance with the second alternative embodiment of the present invention begins with the processor 506 selecting 1802 a next available memory location 510 and RSSI location 1602 for storing the location identifier 204, 208 and the corresponding received signal strength. Then, the processor 506 stores 1804 the location identifier 204, 208 and the received signal strength corresponding to the received periodic transmission in the selected memory location 510 and RSSI location 1602. The processor 506 then returns 1806 to the flowchart 700 (FIG. 7).

Figure 19:
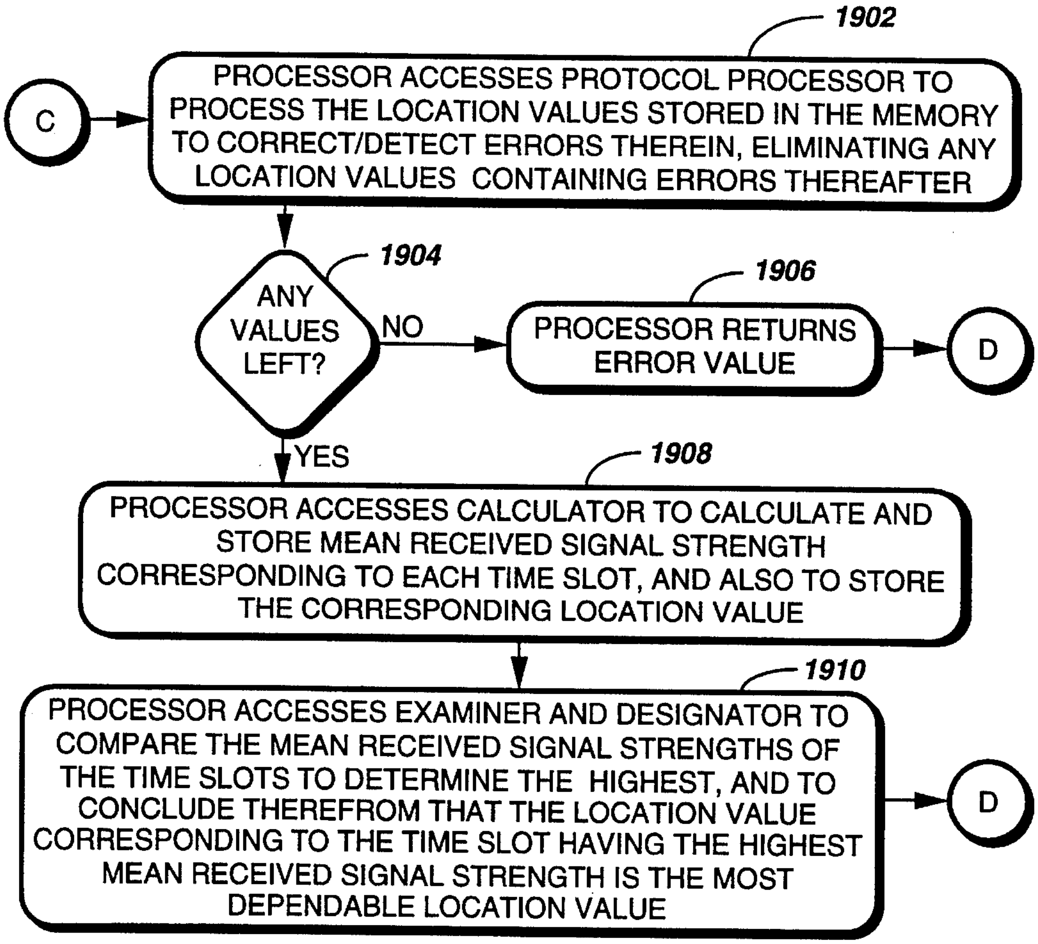
FIG. 19 is a flowchart of a second alternative comparing subroutine in accordance with the second alternative embodiment of the present invention.

Referring to FIG. 19, a flowchart of the second alternative comparing subroutine 1900 in accordance with the second alternative embodiment of the present invention begins with the processor 506 accessing the protocol processor 522 to process 1902 the location values stored in the memory locations 510 to correct/detect errors therein. Any location value containing an error after the processing is eliminated. Next, the processor 506 checks 1904 whether any location values remain. If not, the processor returns 1906 the predetermined error value to the flow chart 700 (FIG. 7).

If, on the other hand, in step 1904 the processor 506 finds that at least one location value remains, then the processor 506 accesses the calculator 1702 to calculate 1908 from the received signal strengths stored in the RSSI locations 1602 during the predetermined period a mean received signal strength corresponding to each time slot, i.e., corresponding to each unique location value stored in the memory locations 510. The processor then stores the calculated mean signal strength in the mean signal strength space 1608 corresponding to the time slot. The processor 506 also stores the location value corresponding to the time slot in the corresponding location identifier space 1606. The processor then accesses the examiner 1704 and the designator 1706 to compare 1910 the calculated mean received signal strengths stored in the mean signal strength slots 1608 to determine the highest mean received signal strength stored. The processor 506 then concludes that the location value stored in the location identifier slot 1606 corresponding to the time slot having the highest mean received signal strength is the most dependable location value, which value is then returned to the flowchart 700.

Thus, the present invention advantageously provides a method and an apparatus for distinguishing location information that is transmitted from a nearby transmitter from that transmitted by more distant transmitters in the system, even in the presence of time-variant shadowing and multipath effects. The present invention advantageously provides a much greater degree of certainty that operational decisions based upon received location information will be made correctly.

What is claimed is:

1. A portable radio receiver for receiving information comprising location identifiers each having a location value, the location identifiers including a nearby location identifier transmitted by a nearby transmitter and distant location identifiers transmitted by more distant transmitters in a radio communication system comprising the portable radio receiver and a plurality of the transmitters, the portable radio receiver distinguishing the nearby location identifier from the distant location identifiers, wherein the location identifiers are transmitted repeatedly in periodic transmissions, the portable radio receiver comprising:

receiver means for receiving over a predetermined period a plurality of the periodic transmissions comprising the location identifiers, wherein the location identifiers are received multiple times throughout the predetermined period;

memory means coupled to the receiver means for storing the location identifiers received in the plurality of the periodic transmissions; and processor means coupled to the memory means for comparing stored portions of the location identifiers with one another to determine the location value received with greatest dependability relative to all other location values received during the predetermined period, and wherein the processor means defines the location value received with the greatest dependability to be the location value of the nearby location identifier;

wherein the periodic transmissions from ones of the plurality of the transmitters are synchronized with the periodic transmissions from others thereof, and wherein the periodic transmissions are frequency modulated (FM) simulcast transmissions, and wherein the portable radio receiver has a defined capture ratio, and wherein the receiver means comprises demodulator means for demodulating a location identifier corresponding to a strongest transmitter producing a highest signal strength at the portable radio receiver during each of the periodic transmissions, wherein the highest signal strength is greater by at least the defined capture ratio than a signal strength produced at the portable radio receiver by the plurality of the transmitters other than the strongest transmitter, and wherein the processor means comprises:

sorter means coupled to the memory means for sorting into like-valued groups the location values that are equal to one another;

counter means coupled to the sorter means for counting the location values sorted into each of the like-valued groups to determine one of the like-valued groups having a highest count; and concluder means coupled to the counter means for concluding therefrom that the location value of the one of the like-valued groups having the highest count is the location value received with the greatest dependability.

2. A portable radio receiver for receiving information comprising location identifiers each having a location value, the location identifiers including a nearby location identifier transmitted by a nearby transmitter and distant location identifiers transmitted by more distant transmitters in a radio communication system comprising the portable radio receiver and a plurality of the transmitters, the portable radio receiver distinguishing the nearby location identifier from the distant location identifiers, wherein the location identifiers are transmitted repeatedly in periodic transmissions, the portable radio receiver comprising:

receiver means for receiving over a predetermined period a plurality of the periodic transmissions comprising the location identifiers, wherein the location identifiers are received multiple times throughout the predetermined period;

memory means coupled to the receiver means for storing the location identifiers received in the plurality of the periodic transmissions; and processor means coupled to the memory means for comparing stored portions of the location identifiers with one another to determine the location value received with greatest dependability relative to all other location values received during the predetermined period, and wherein the processor means defines the location value received with the greatest dependability to be the location value of the nearby location identifier;

wherein the periodic transmissions from ones of the plurality of the transmitters are synchronized with the periodic transmissions from others thereof, and wherein the periodic transmissions are simulcast transmissions comprising digital data bits transmitted at a plurality of predetermined bit positions, and wherein the processor means comprises:

examiner means coupled to the memory means for examining at one of the plurality of predetermined bit positions the digital data bits corresponding to the location identifiers received and stored during the predetermined period;

determiner means coupled to the examiner means for determining that more than a predetermined percentage of the digital data bits at the one of the plurality of predetermined bit positions have a single coequal value;

designator means coupled to the determiner means for designating the single coequal value to be an estimated bit value for the one of the plurality of predetermined bit positions;

repeater means coupled to the examiner means for repeating the examining, determining, and designating for each of the plurality of predetermined bit positions until a plurality of estimated bit values corresponding to the plurality of predetermined bit positions have been designated; and concluder means coupled to the repeater means for concluding that the plurality of estimated bit values represent the location value received with the greatest dependability.

3. A portable radio receiver for receiving information comprising location identifiers each having a location value, the location identifiers including a nearby location identifier transmitted by a nearby transmitter and distant location identifiers transmitted by more distant transmitters in a radio communication system comprising the portable radio receiver and a plurality of the transmitters, the portable radio receiver distinguishing the nearby location identifier from the distant location identifiers, wherein the location identifiers are transmitted repeatedly in periodic transmissions, the portable radio receiver comprising:

receiver means for receiving over a predetermined period a plurality of the periodic transmissions comprising the location identifiers, wherein the location identifiers are received multiple times throughout the predetermined period;

memory means coupled to the receiver means for storing the location identifiers received in the plurality of the periodic transmissions; and processor means coupled to the memory means for comparing stored portions of the location identifiers with one another to determine the location value received with greatest dependability relative to all other location values received during the predetermined period, and wherein the processor means defines the location value received with the greatest dependability to be the location value of the nearby location identifier;

wherein the periodic transmissions from ones of the plurality of the transmitters are synchronized with the periodic transmissions from others thereof, and wherein the periodic transmissions are simulcast transmissions comprising digital data symbols transmitted at a plurality of predetermined symbol positions, and wherein the processor means comprises:

examiner means coupled to the memory means for examining at one of the plurality of predetermined symbol positions the digital data symbols corresponding to the location identifiers received and stored during the predetermined period;

determiner means coupled to the examiner means for determining that more than a predetermined percentage of the digital data symbols at the one of the plurality of predetermined symbol positions have a single coequal value;

designator means coupled to the determiner means for designating in response the single coequal value to be an estimated symbol value for the one of the plurality of predetermined symbol positions;

repeater means coupled to the examiner means for repeating the examining, determining, and designating for each of the plurality of predetermined symbol positions until a plurality of estimated symbol values corresponding to the plurality of predetermined symbol positions have been designated; and concluder means coupled to the repeater means for concluding that the plurality of estimated symbol values represent the location value received with the greatest dependability.

4. A portable radio receiver for receiving information comprising location identifiers each having a location value, the location identifiers including a nearby location identifier transmitted by a nearby transmitter and distant location identifiers transmitted by more distant transmitters in a radio communication system comprising the portable radio receiver and a plurality of the transmitters, the portable radio receiver distinguishing the nearby location identifier from the distant location identifiers, wherein the location identifiers are transmitted repeatedly in periodic transmissions, the portable radio receiver comprising:

receiver means for receiving over a predetermined period a plurality of the periodic transmissions comprising the location identifiers, wherein the location identifiers are received multiple times throughout the predetermined period;

memory means coupled to the receiver means for storing data derived from the plurality of the periodic transmissions, the data comprising the location identifiers; and processor means coupled to the memory means for comparing stored portions of the data with one another to determine the location value received with greatest dependability relative to all other location values received during the predetermined period, and wherein the processor means defines the location value received with the greatest dependability to be the location value of the nearby location identifier, wherein the plurality of the periodic transmissions are sequential transmissions occurring in a plurality of predetermined non-overlapping time slots, each time slot dedicated for transmission of a corresponding one of the location identifiers, and wherein the receiver means comprises a received signal strength indicator (RSSI) for measuring received signal strength of each of the plurality of the periodic transmissions, and wherein the memory means comprises locations coupled to the RSSI for storing the received signal strength measured for each of the plurality of the periodic transmissions, and wherein the processor means comprises:

calculator means coupled to the memory means for calculating from the received signal strengths stored, for each of the plurality of predetermined non-overlapping time slots, a mean received signal strength value of the periodic transmissions occurring therein over the predetermined period;

examiner means coupled to the calculator means for examining the mean received signal strength values calculated to determine the time slot having a highest mean received signal strength value; and designator means coupled to the examiner means for designating the location value received during said time slot to be the location value received with the greatest dependability.

5. A probabilistic method in a radio communication system comprising a plurality of transmitters and a portable radio receiver, the method for transmitting and receiving information comprising location identifiers each having a location value, the location identifiers including a nearby location identifier transmitted to the portable radio receiver by a nearby transmitter, and distant location identifiers transmitted to the portable radio receiver by more distant transmitters, the method further for distinguishing the nearby location identifier from the distant location identifiers, wherein the location identifiers are transmitted repeatedly in periodic transmissions, the method comprising in the portable communication receiver the steps of:

receiving over a predetermined period a plurality of the periodic transmissions comprising the location identifiers, wherein the location identifiers are received multiple times throughout the predetermined period;

storing the location identifiers received in the plurality of the periodic transmissions;

comparing stored portions of the location identifiers with one another to determine the location value received with greatest dependability relative to all other location values received during the predetermined period; and defining the location value received with the greatest dependability to be the location value of the nearby location identifier;

wherein the periodic transmissions from ones of the plurality of the transmitters are synchronized with the periodic transmissions from others thereof, and wherein the periodic transmissions are frequency modulated (FM) simulcast transmissions, and wherein the portable radio receiver has a defined capture ratio, and wherein the receiving step comprises the step of demodulating a location identifier corresponding to a strongest transmitter producing a highest signal strength at the portable radio receiver during each of the periodic transmissions, wherein the highest signal strength is greater by at least the defined capture ratio than a signal strength produced at the portable radio receiver by the plurality of the transmitters other than the strongest transmitter, and wherein the comparing step comprises the steps of:

sorting into like-valued groups the location values that are equal to one another;

counting the location values sorted into each of the like-valued groups to determine one of the like-valued groups having a highest count; and concluding therefrom that the location value of the one of the like-valued groups having the highest count is the location value received with the greatest dependability.

6. A probabilistic method in a radio communication system comprising a plurality of transmitters and a portable radio receiver, the method for transmitting and receiving information comprising location identifiers each having a location value, the location identifiers including a nearby location identifier transmitted to the portable radio receiver by a nearby transmitter, and distant location identifiers transmitted to the portable radio receiver by more distant transmitters, the method further for distinguishing the nearby location identifier from the distant location identifiers, wherein the location identifiers are transmitted repeatedly in periodic transmissions, the method comprising in the portable communication receiver the steps of:

receiving over a predetermined period a plurality of the periodic transmissions comprising the location identifiers, wherein the location identifiers are received multiple times throughout the predetermined period;

storing the location identifiers received in the plurality of the periodic transmissions;

comparing stored portions of the location identifiers with one another to determine the location value received with greatest dependability relative to all other location values received during the predetermined period; and defining the location value received with the greatest dependability to be the location value of the nearby location identifier;

wherein the periodic transmissions from ones of the plurality of the transmitters are synchronized with the periodic transmissions from others thereof, and wherein the periodic transmissions are simulcast transmissions comprising digital data bits transmitted at a plurality of predetermined bit positions, and wherein the comparing step comprises the steps of:

examining at one of the plurality of predetermined bit positions the digital data bits corresponding to the location identifiers received and stored during the predetermined period;

determining during the examining step that more than a predetermined percentage of the digital data bits at the one of the plurality of predetermined bit positions have a single coequal value;

designating the single coequal value to be an estimated bit value for the one of the plurality of predetermined bit positions;

repeating the examining, determining, and designating steps for each of the plurality of predetermined bit positions until a plurality of estimated bit values corresponding to the plurality of predetermined bit positions have been designated; and concluding that the plurality of estimated bit values represent the location value received with the greatest dependability.

7. A probabilistic method in a radio communication system comprising a plurality of transmitters and a portable radio receiver, the method for transmitting and receiving information comprising location identifiers each having a location value, the location identifiers including a nearby location identifier transmitted to the portable radio receiver by a nearby transmitter, and distant location identifiers transmitted to the portable radio receiver by more distant transmitters, the method further for distinguishing the nearby location identifier from the distant location identifiers, wherein the location identifiers are transmitted repeatedly in periodic transmissions, the method comprising in the portable communication receiver the steps of:

receiving over a predetermined period a plurality of the periodic transmissions comprising the location identifiers, wherein the location identifiers are received multiple times throughout the predetermined period;

storing the location identifiers received in the plurality of the periodic transmissions;

comparing stored portions of the location identifiers with one another to determine the location value received with greatest dependability relative to all other location values received during the predetermined period; and defining the location value received with the greatest dependability to be the location value of the nearby location identifier;

wherein the periodic transmissions from ones of the plurality of the transmitters are synchronized with the periodic transmissions from others thereof, and wherein the periodic transmissions are simulcast transmissions comprising digital data symbols transmitted at a plurality of predetermined symbol positions, and wherein the comparing step comprises the steps of:

examining at one of the plurality of predetermined symbol positions the digital data symbols corresponding to the location identifiers received and stored during the predetermined period;

determining during the examining step that more than a predetermined percentage of the digital data symbols at the one of the plurality of predetermined symbol positions have a single coequal value;

designating in response the single coequal value to be an estimated symbol value for the one of the plurality of predetermined symbol positions;

repeating the examining, determining, and designating steps for each of the plurality of predetermined symbol positions until a plurality of estimated symbol values corresponding to the plurality of predetermined symbol positions have been designated; and concluding that the plurality of estimated symbol values represent the location value received with the greatest dependability.

8. A probabilistic method in a radio communication system comprising a plurality of transmitters and a portable radio receiver, the method for transmitting and receiving information comprising location identifiers each having a location value, the location identifiers including a nearby location identifier transmitted to the portable radio receiver by a nearby transmitter, and distant location identifiers transmitted to the portable radio receiver by more distant transmitters, the method further for distinguishing the nearby location identifier from the distant location identifiers, wherein the location identifiers are transmitted repeatedly in periodic transmissions, the method comprising in the portable communication receiver the steps of:

receiving over a predetermined period a plurality of the periodic transmissions comprising the location identifiers, wherein the location identifiers are received multiple times throughout the predetermined period;

storing data derived from the plurality of the periodic transmissions, the data comprising the location identifiers;

comparing stored portions of the data with one another to determine the location value received with greatest dependability relative to all other location values received during the predetermined period; and defining the location value received with the greatest dependability to be the location value of the nearby location identifier, wherein the plurality of the periodic transmissions are sequential transmissions occurring in a plurality of predetermined non-overlapping time slots, each time slot dedicated for transmission of a corresponding one of the location identifiers, and wherein the receiving step comprises the step of measuring received signal strength of each of the plurality of the periodic transmissions, and wherein the storing step comprises storing the received signal strength measured for each of the plurality of the periodic transmissions, and wherein the comparing step comprises the steps of:

calculating from the received signal strengths stored, for each of the plurality of predetermined non-overlapping time slots, a mean received signal strength value of the periodic transmissions occurring therein over the predetermined period;

examining the mean received signal strength values calculated to determine the time slot having a highest mean received signal strength value; and designating the location value received during said time slot to be the location value received with the greatest dependability.

* * * * *